United States Patent
Li et al.

(10) Patent No.: US 12,001,397 B2
(45) Date of Patent: Jun. 4, 2024

(54) METHOD, APPARATUS AND DEVICE FOR DELETING DISTRIBUTED SYSTEM FILE, AND STORAGE MEDIUM

(71) Applicant: Inspur Electronic Information Industry Co., Ltd., Jinan (CN)

(72) Inventors: Wei Li, Jinan (CN); Xiangrui Meng, Jinan (CN)

(73) Assignee: Inspur Electronic Information Industry Co., Ltd., Jinan (CN)

(*) Notice: Subject to any disclaimer, the term of this patent is extended or adjusted under 35 U.S.C. 154(b) by 18 days.

(21) Appl. No.: 17/780,881

(22) PCT Filed: Jul. 23, 2020

(86) PCT No.: PCT/CN2020/103740
§ 371 (c)(1),
(2) Date: May 27, 2022

(87) PCT Pub. No.: WO2021/103600
PCT Pub. Date: Jun. 3, 2021

(65) Prior Publication Data
US 2023/0025135 A1 Jan. 26, 2023

(30) Foreign Application Priority Data
Nov. 29, 2019 (CN) .......................... 201911205045.1

(51) Int. Cl.
*G06F 17/30* (2006.01)
*G06F 16/13* (2019.01)
(Continued)

(52) U.S. Cl.
CPC .......... *G06F 16/162* (2019.01); *G06F 16/134* (2019.01); *G06F 16/148* (2019.01); *G06F 16/182* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,473,532 B1 * 6/2013 Ben .......................... G06F 16/13
707/831
8,488,178 B2 * 7/2013 Fukata .................. G06F 3/1285
358/1.16
(Continued)

FOREIGN PATENT DOCUMENTS

CN 101692239 A 4/2010
CN 102368222 A 3/2012
(Continued)

OTHER PUBLICATIONS

Search Report and Written Opinion, PCT/CN2020/103740, dated Oct. 28, 2020.

*Primary Examiner* — Hung D Le
(74) *Attorney, Agent, or Firm* — David R. Stevens; Stevens Law Group

(57) ABSTRACT

A method, apparatus and device for deleting a distributed system file, and a storage medium, comprising: querying whether an incomplete file deletion operation exists under a sub-tree root corresponding to a certain MDS (S102); if there is an incomplete file deletion operation, continuing to delete data under the sub-tree root corresponding to the MDS, and determining whether the sub-tree root is a copy (S103); and if the sub-tree root is a copy, deleting the sub-tree root copy in a memory of the MDS (S104). By means of the steps, the number of copies of the sub-tree root in the distributed file system can be reduced, thereby reducing the number of interaction times of master copy locking between different MDSs, improving the file deletion effi-
(Continued)

ciency, and improving user friendliness and differentiated competitiveness of a product.

5 Claims, 3 Drawing Sheets

(51) Int. Cl.
  *G06F 16/14* (2019.01)
  *G06F 16/16* (2019.01)
  *G06F 16/182* (2019.01)

(56) References Cited

U.S. PATENT DOCUMENTS

| | | | |
|---|---|---|---|
| 9,563,628 B1* | 2/2017 | MacNeill | G06F 16/23 |
| 9,678,968 B1* | 6/2017 | Taylor | G06F 11/1435 |
| 9,986,013 B2* | 5/2018 | Thomas | G06F 16/1727 |
| 10,216,757 B1* | 2/2019 | Armangau | G06F 16/178 |
| 10,261,944 B1* | 4/2019 | Armangau | G06F 16/162 |
| 10,387,369 B1* | 8/2019 | Davenport | G06F 3/0689 |
| 11,561,899 B2* | 1/2023 | Accapadi | G06F 16/172 |
| 2005/0223004 A1* | 10/2005 | McKenney | G06F 16/10 |
| 2008/0016090 A1* | 1/2008 | Fukata | G06F 3/1274 |
| 2010/0131462 A1* | 5/2010 | Huslak | G06F 16/178 |
| | | | 707/610 |
| 2012/0078845 A1* | 3/2012 | Kasbekar | G06Q 10/107 |
| | | | 707/E17.069 |
| 2012/0096059 A1* | 4/2012 | Shimizu | G06F 3/0689 |
| | | | 707/828 |
| 2012/0317077 A1* | 12/2012 | Chung | G06F 16/137 |
| | | | 707/634 |
| 2013/0132447 A1* | 5/2013 | Maeda | G06F 16/162 |
| | | | 707/821 |
| 2013/0212136 A1* | 8/2013 | Nishida | G06F 16/11 |
| | | | 707/830 |
| 2013/0218934 A1 | 8/2013 | Lin | |
| 2015/0186395 A1* | 7/2015 | Yan | G06F 16/483 |
| | | | 707/609 |
| 2017/0331892 A1* | 11/2017 | Crofton | H04L 67/06 |
| 2018/0075053 A1* | 3/2018 | Karr | G06F 3/0679 |
| 2019/0347033 A1* | 11/2019 | Wei | G06F 3/0673 |
| 2020/0218614 A1* | 7/2020 | Adduri | G06F 16/128 |
| 2020/0379906 A1* | 12/2020 | Accapadi | G06F 12/0897 |
| 2021/0182241 A1* | 6/2021 | Dageville | G06F 16/137 |
| 2023/0251783 A1* | 8/2023 | Lee | G06F 3/0652 |
| | | | 707/692 |

FOREIGN PATENT DOCUMENTS

| | | |
|---|---|---|
| CN | 103150394 A | 6/2013 |
| CN | 103218175 A | 7/2013 |
| CN | 103279568 A | 9/2013 |
| CN | 106874383 A | 6/2017 |
| CN | 107491529 A | 12/2017 |
| CN | 109492201 A | 3/2019 |
| CN | 111125024 A | 5/2020 |
| WO | WO2018058949 A1 | 4/2018 |

* cited by examiner

METHOD, APPARATUS AND DEVICE FOR DELETING DISTRIBUTED SYSTEM FILE, AND STORAGE MEDIUM

CROSS REFERENCE TO RELATED APPLICATIONS

This application claims priority to Chinese patent application No. 201911205045.1, filed to the CNIPA on Nov. 29, 2019 and entitled "Method, Apparatus and Device for Deleting File in Distributed system, and Storage Medium", the entire contents of which are incorporated herein by reference.

TECHNICAL FIELD

The present disclosure relates to the technical field of distributed storage, in particular to a method, apparatus and device for deleting a file in a distributed system, and a storage medium.

BACKGROUND

In the current distributed storage file system, when a file is created, a metadata server (MDS) will pre-allocate a size of 8*4 M (4 M is a default stripe value) to metadata of the file one time, if a space required by the file in a writing process exceeds the value, the MDS continues to pre-allocate a space to the metadata of the file, if the space required by the file in the writing process does not exceed the value, the MDS will not re-allocate a space to the file, but the size value of the pre-allocated space identified in the metadata of the file is not changed, the pre-allocated size of the metadata of the file is not the size actually occupied by the file, and is only an identification of the maximum size possible for the file in the metadata.

Currently, a plurality of MDSs generally exist in a distributed file system, and more than one sub-tree generally exists in a service model. Especially, if most of the services are read-write and deletion operations of small files (smaller than 4 M), in such a scene, when the file is deleted, it needs to wait for locking and unlocking of a master and copies of a sub-tree root between different MDSs due to the deletion operation; moreover, although the file only writes part of data, when deleted, the file needs to be decomposed into 4 M-size objects to be deleted, and thus, although the small files only write about 4 M data, the small files are still divided into 8 objects to be deleted and are issued to an object storage device (OSD) by the MDS to complete the deleting operation. The locking and redundant deletion issuing operations may cause reduction of the file deletion efficiency; and if the difference of the number of sub-tree roots with services to be deleted on the plurality of MDSs is large, load of some MDSs is too high, and the overall deletion efficiency is reduced.

Therefore, how to improve the file deletion efficiency under a distributed storage file system is a technical problem to be solved urgently by those skilled in the art.

SUMMARY

In view of the above problem, the present disclosure provides a method, apparatus and device for deleting a file in a distributed system, and a storage medium, which solve the above problem or at least partially solve the above problem.

A method for deleting a file in a distributed system includes:
  querying whether an incomplete file deletion operation exists under a sub-tree root corresponding to a certain MDS;
  continuing to delete data under the sub-tree root corresponding to the MDS if there is an incomplete file deletion operation, and determining whether the sub-tree root is a copy; and
  deleting the sub-tree root copy in a memory of the MDS if the sub-tree root is a copy.

Preferably, the method for deleting a file in a distributed system provided by embodiments of the present disclosure further includes:
  creating a timed deleting task in the distributed system if there is no incomplete file deletion operation; and
  balancing the number of sub-tree roots to be deleted among different MDSs according to the created timed deleting task.

Preferably, in the method for deleting a file in a distributed system provided by the embodiments of the present disclosure, balancing the number of sub-tree roots to be deleted among different MDSs according to the created timed deleting task specifically includes:
  acquiring and recording the number of sub-tree roots to be deleted with the timed deleting task on each MDS;
  calculating an average value of the number of sub-tree roots to be deleted on all MDSs; and
  migrating sub-tree roots to be deleted to the MDSs having a number of sub-tree roots to be deleted lower than the average value sequentially from the MDS having the largest number of sub-tree roots to be deleted, until no MDS having a number of sub-tree roots to be deleted less than the average value exists.

Preferably, the method for deleting a file in a distributed system provided by the embodiments of the present disclosure further includes:
  performing segmentation and deletion operations on a file to be deleted according to the actual size of the file.

Preferably, in the method for deleting a file in a distributed system provided by the embodiments of the present disclosure, performing segmentation and deletion operations on a file to be deleted according to the actual size of the file specifically includes:
  segmenting the file to be deleted into a plurality of objects to be deleted of which the size is equal to a stripe value according to the actual size of the file;
  sending the objects to be deleted to an OSD corresponding to the objects to be deleted sequentially according to a preset sequence; and
  performing a disk deletion operation on all the objects to be deleted by means of the OSD.

The embodiments of the present disclosure further include an apparatus for deleting a file in a distributed system, including:
  an operation querying module, configured to query whether an incomplete file deletion operation exists under a sub-tree root corresponding to a certain MDS;
  a copy determining module, configured to continue to delete data under the sub-tree root corresponding to the MDS if there is an incomplete file deletion operation, and determine whether the sub-tree root is a copy; and
  a copy deleting module, configured to delete the sub-tree root copy in a memory of the MDS if the sub-tree root is a copy.

Preferably, the apparatus for deleting a file in a distributed system provided by the embodiments of the present disclosure further includes:
- a task creating module, configured to create a timed deleting task in the distributed system if there is no incomplete file deletion operation; and
- a sub-tree root balancing module, configured to balance the number of sub-tree roots to be deleted among different MDSs according to the created timed deleting task.

Preferably, the apparatus for deleting a file in a distributed system provided by the embodiments of the present disclosure further includes:
- a file segmenting module, configured to perform segmentation and deletion operations on a file to be deleted according to the actual size of the file.

The embodiments of the present disclosure further provides a device for deleting a file in a distributed system, including a processor and a memory, wherein the processor implements the method for deleting a file in a distributed system provided by the embodiments of the present disclosure when executing a computer program stored in the memory.

The embodiments of the present disclosure also provide a computer readable storage medium, which is used for storing a computer program, wherein the computer program implements the method for deleting a file in a distributed system provided by the embodiments of the present disclosure when executed by the processor.

By the aid of the technical solutions, the present disclosure provides the method, apparatus and device for deleting a file in a distributed system, and the storage medium, including: querying whether an incomplete file deletion operation exists under a sub-tree root corresponding to a certain MDS; continuing to delete data under the sub-tree root corresponding to the MDS if there is an incomplete file deletion operation, and determining whether the sub-tree root is a copy; and deleting the sub-tree root copy in a memory of the MDS if the sub-tree root is a copy.

According to the present disclosure, by means of the steps, the number of copies of the sub-tree root in the distributed file system can be reduced, thereby reducing the number of interaction times of master copy locking between different MDSs, improving the file deletion efficiency, and improving user friendliness and differentiated competitiveness of a product.

The foregoing description is merely an overview of technical solutions of the present disclosure, in order that the technical means of the present disclosure can be more clearly understood, the technical means may be implemented according to the contents of the description, and in order that the above and other objects, features, and advantages of the present disclosure can be more clearly understood, the following specific embodiments of the present disclosure are specifically given.

BRIEF DESCRIPTION OF THE DRAWINGS

Various other advantages and benefits will become apparent to those of ordinary skill in the art upon reading the following detailed description of the preferred embodiments. The drawings are only for the purpose of illustrating the preferred embodiments and are not to be considered limiting of the present disclosure. Also, like components are denoted by like reference numerals throughout the drawings. In the drawings.

DETAILED DESCRIPTION

The technical solutions in embodiments of the present disclosure will now be clearly and fully described in conjunction with the accompanying drawings in embodiments of the present disclosure, and it is apparent that the described embodiments are only some, but not all, embodiments of the present disclosure. Based on the embodiments of the present disclosure, all other embodiments obtained by a person of ordinary skill in the art without creative work fall within the scope of protection of the present disclosure.

Figure 1:
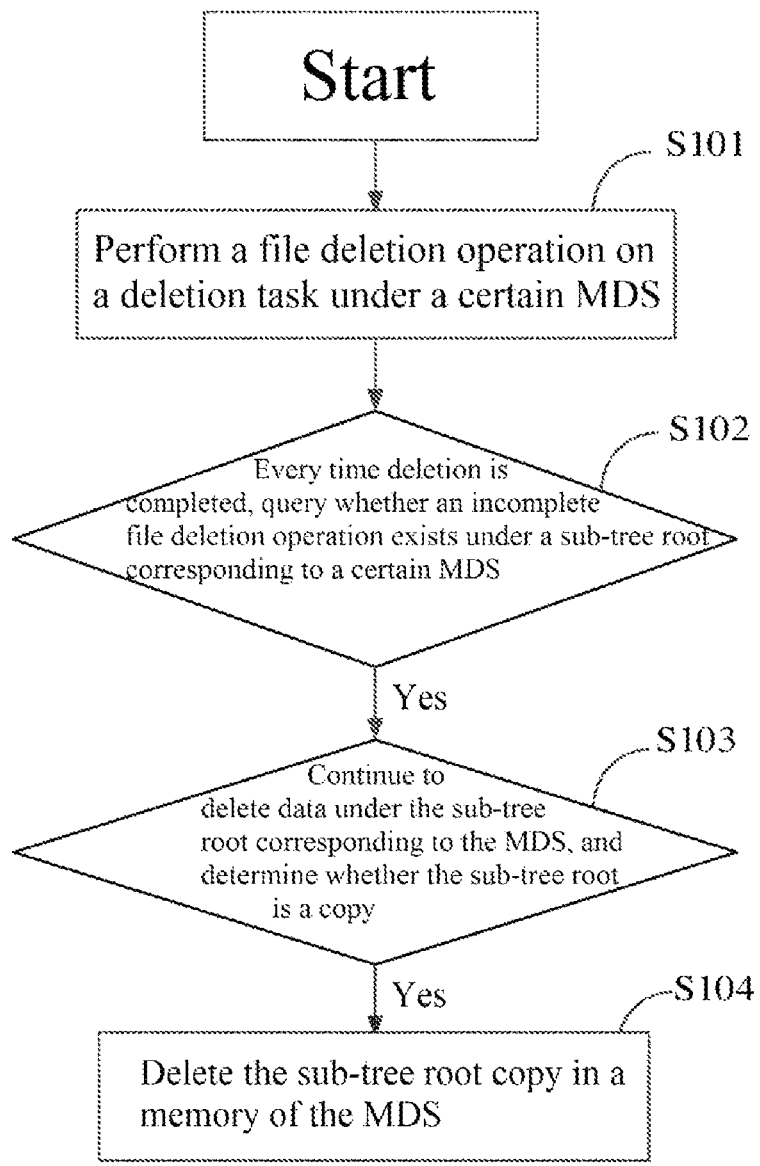
FIG. 1 shows a first flowchart of a method for deleting a file in a distributed system according to an embodiment of the present disclosure.

The present disclosure provides a method for deleting a file in a distributed system, as shown in FIG. 1, including the following steps:
- S101, performing a file deletion operation on a deletion task under a certain MDS;
- S102, querying whether an incomplete file deletion operation exists under a sub-tree root corresponding to a certain MDS every time deletion is completed;
- if there is an incomplete file deletion operation, executing step S103;
- S103, continuing to delete data under the sub-tree root corresponding to the MDS, and determining whether the sub-tree root is a copy; and
- if the sub-tree root is a copy, executing step S104; and if the sub-tree root is a master, directly skipping step S104; wherein whether the sub-tree root is a master or a copy can be determined by means of the attribute mark in the inode of the sub-tree root.
- S104, deleting the sub-tree root copy in a memory of the MDS.

The method for deleting a file in a distributed system provided by the embodiments of the present disclosure includes: querying whether an incomplete file deletion operation exists under a sub-tree root corresponding to a certain MDS; continuing to delete data under the sub-tree root corresponding to the MDS if there is an incomplete file deletion operation, and determining whether the sub-tree root is a copy; and deleting the sub-tree root copy in a memory of the MDS if the sub-tree root is a copy. By means of the steps, the number of copies of the sub-tree root in the distributed file system can be reduced, thereby reducing the number of interaction times of master copy locking between different MDSs, improving the file deletion efficiency, and improving user friendliness and differentiated competitiveness of a product.

Figure 2:
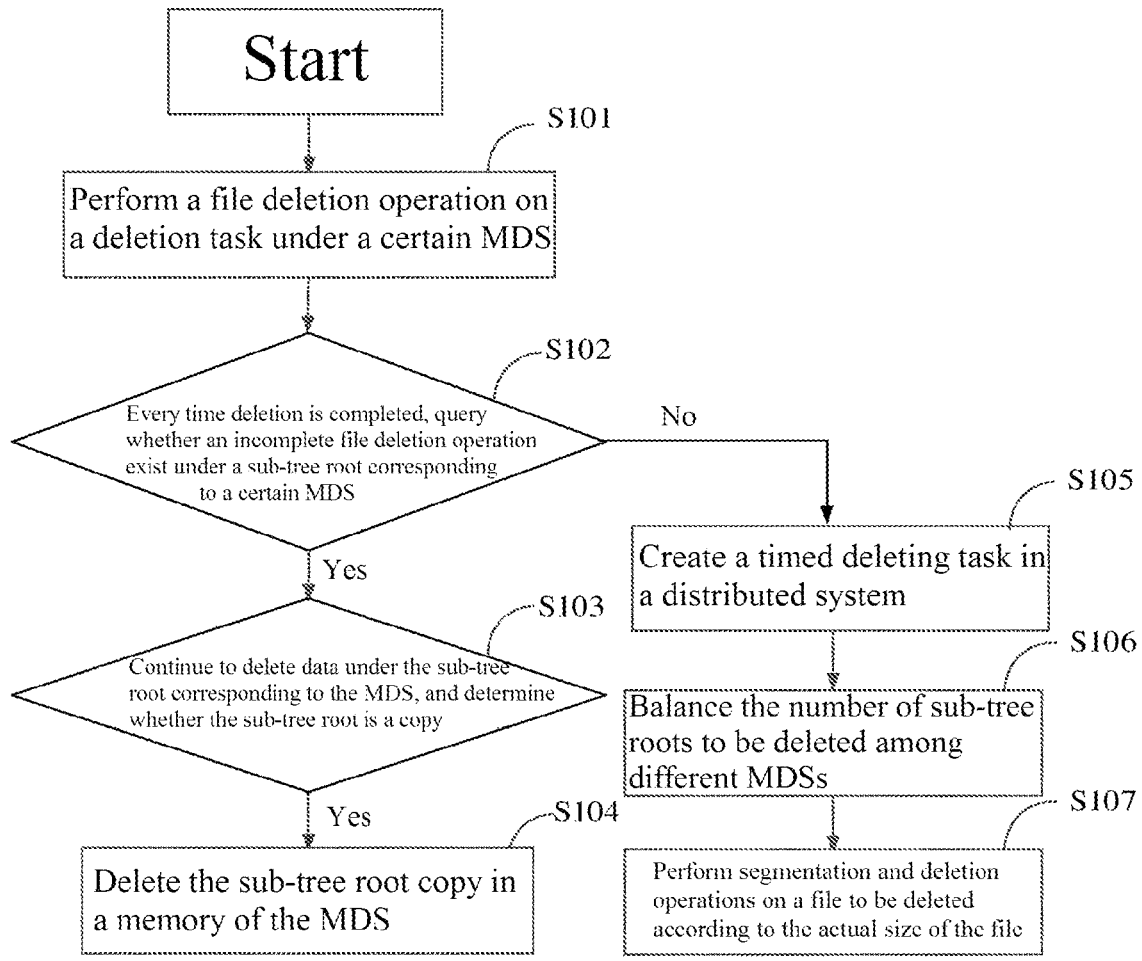
FIG. 2 shows a second flowchart of a method for deleting a file in a distributed system according to an embodiment of the present disclosure.

During specific implementation, the method for deleting a file in a distributed system provided by the embodiments of the present disclosure, as shown in FIG. 2 further includes:
- executing step S105 if there is no incomplete file deletion operation;
- S105, creating a timed deleting task in the distributed system; wherein it should be understood that the time periods in the timed deleting task can be specified by a user according to service conditions, and those time periods with less normal non-deleting services are generally selected; and after the task is started, the following operations are carried out:

S106, balancing the number of sub-tree roots to be deleted among different MDSs according to the created timed deleting task.

By means of step S106, the number of the sub-tree roots to be deleted among different MDSs can be roughly consistent, so that the deletion task pressure among different MDSs is roughly consistent, the performance of all the MDSs is fully exerted, and the purpose of improving the overall deletion performance is achieved.

Further, during specific implementation, step S106 of balancing the number of sub-tree roots to be deleted among different MDSs according to the created timed deleting task may specifically include the following steps:

step one, acquiring and recording the number of sub-tree roots to be deleted with the timed deleting task on each MDS;

step two, calculating an average value of the number of sub-tree roots to be deleted on all MDSs; and step three, migrating sub-tree roots to be deleted to the MDSs having a number of sub-tree roots to be deleted lower than the average value sequentially from the MDS having the largest number of sub-tree roots to be deleted, until no MDS having a number of sub-tree roots to be deleted less than the average value exists.

During specific implementation, the method for deleting a file in a distributed system provided by the embodiments of the present disclosure, as shown in FIG. 2, further includes:

S107, performing segmentation and deletion operations on a file to be deleted according to the actual size of the file.

It can be understood that, when a file is created, an MDS will pre-allocate a size (generally, 8*stripe value, and 4 M is generally the default value of the stripe value) in metadata of the file, after the metadata of the file is created, data is actually written into the file, if the size of the written file is not larger than the size of the file pre-allocated in the metadata, the system will not continue to apply for space allocation to the MDS (the MDS allocates a certain space to a client every time as required), otherwise, the system will continue to apply for space allocation to the MDS, and the MDS re-allocates a writable space to the client; here, two sizes of the file are recorded in the metadata, one is a pre-allocated file size, and the other is a size to which the file is actually written (namely the actual size of the file). According to the present disclosure, segmentation of the file to be deleted and the subsequent deletion operation are realized according to the actual size of the file.

Further, during specific implementation, step S107 of performing segmentation and deletion operations on a file to be deleted according to the actual size of the file may specifically include:

firstly, segmenting the file to be deleted into a plurality of objects to be deleted of which the size is equal to a stripe value according to the actual size of the file; wherein specifically, in the original operation, allocation is carried out according to the pre-allocated size of the metadata, especially for small files smaller than 1 M, such an allocation method may cause a lot of empty unnecessarily deleted objects to be deleted to be generated, and in the present disclosure, for each file to be deleted, the MDS segments the file into objects of which the size is equal to the stripe value (4 M in default) according to the actual size;

secondly, sending the objects to an OSD corresponding to the objects to be deleted sequentially according to a preset sequence; and finally, performing a disk deletion operation on all the objects to be deleted by means of the OSD; wherein only after all the objects to be deleted formed by segmenting one file are deleted, the file is considered to be deleted.

By means of the above steps, empty unnecessarily generated objects to be deleted may be reduced; according to the segmentation method, for the deletion operation of small files (the size is smaller than 1 M, and ⅞ of objects to be deleted are unnecessarily generated in each segmentation), performance improvement is particularly obvious; and moreover, the number of interaction times between the MDS and the OSD may be greatly reduced by reducing the number of objects to be deleted formed by segmenting the file, so that the overall deletion process is accelerated.

Based on the same inventive concept, the embodiments of the present disclosure further provide an apparatus for deleting a file in a distributed system, and the problem solving principle of the apparatus for deleting a file in a distributed system is similar to that of the foregoing method for deleting a file in a distributed system, and therefore, implementation of the apparatus for deleting a file in a distributed system may refer to implementation of the method for deleting a file in a distributed system, and the repetition is not described in detail.

Figure 3:
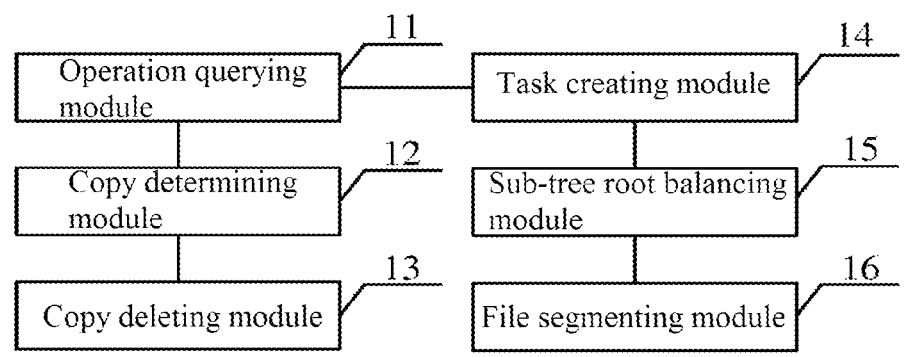
FIG. 3 shows a structural schematic diagram of an apparatus for deleting a file in a distributed system according to an embodiment of the present disclosure.

During specific implementation, the apparatus for deleting a file in a distributed system provided by the embodiments of the present disclosure, as shown in FIG. 3, specifically includes:

an operation querying module 11, configured to query whether an incomplete file deletion operation exists under a sub-tree root corresponding to a certain MDS;

a copy determining module 12, configured to continue to delete data under the sub-tree root corresponding to the MDS if there is an incomplete file deletion operation, and determine whether the sub-tree root is a copy; and a copy deleting module 13, configured to delete the sub-tree root copy in a memory of the MDS if the sub-tree root is a copy.

In the apparatus for deleting a file in a distributed system provided by the embodiments of the present disclosure, by the interaction of the three modules, the number of copies of the sub-tree root in the distributed file system may be reduced, thereby reducing the number of interaction times of master and copy locking between different MDSs, and improving the file deletion efficiency.

Further, during specific implementation, the apparatus for deleting a file in a distributed system provided by the embodiments of the present disclosure, can further include:

a task creating module 14, configured to create a timed deleting task in a distributed system if there is no incomplete file deletion operation; and a sub-tree root balancing module 15, configured to balance the number of sub-tree roots to be deleted among different MDSs according to the created timed deleting task.

By the interaction of the two modules, the number of sub-tree roots to be deleted among different MDSs may be roughly consistent, so that the deletion task pressure among different MDSs is roughly consistent, the performance of all the MDSs is fully exerted, and the purpose of improving the overall deletion performance is achieved.

Further, during specific implementation, the apparatus for deleting a file in a distributed system provided by the embodiments of the present disclosure may further include:

a file segmenting module 16, configured to perform segmentation and deletion operations on a file to be deleted according to the actual size of the file.

By the module, empty unnecessarily generated objects to be deleted may be reduced, the number of interaction times between the MDS and the OSD is greatly reduced, and the whole deletion process is accelerated.

For more specific working processes of the above modules, reference may be made to corresponding contents disclosed in the foregoing embodiments, and details are not described herein again.

Correspondingly, the embodiments of the present disclosure further disclose a device for deleting a file in a distributed system, including a processor and a memory; wherein the processor implements the method for deleting a file in a distributed system disclosed by the embodiments when executing a computer program stored in the memory.

For more specific processes of the method, reference may be made to corresponding contents disclosed in the foregoing embodiments, and details are not repeated here.

Further, the present disclosure discloses a computer readable storage medium, which is used for storing a computer program; and the computer program implements the method for deleting a file in a distributed system disclosed above when executed by the processor.

For more specific processes of the method, reference may be made to corresponding contents disclosed in the foregoing embodiments, and details are not repeated here.

In the present specification, the embodiments are described in a progressive manner, and each embodiment focuses on differences from other embodiments, and the same or similar parts between the embodiments are referred to each other. The apparatus, the device and the storage medium disclosed by the embodiments correspond to the method disclosed by the embodiment, so that the description is simple, and the relevant points can be referred to the method part for description.

Those of skill would further appreciate that the various illustrative components and algorithm steps described in connection with the embodiments disclosed herein may be implemented as electronic hardware, computer software, or combinations of both, and that the components and steps of the various examples have been described above generally in terms of their functionality in order to clearly illustrate this interchangeability of hardware and software. Whether such functionality is implemented as hardware or software depends upon the particular application and design constraints imposed on the technical solution. Skilled professionals may implement the described functionality in varying ways for each particular application, but such implementation decisions should not be considered beyond the scope of the present application.

The steps of a method or algorithm described in connection with the embodiments disclosed herein may be embodied directly in hardware, in a software module executed by a processor, or in a combination of the two. A software module may reside in a random access memory (RAM), a memory, a read-only memory (ROM), an electrically programmable ROM, an electrically erasable programmable ROM, registers, a hard disk, a removable disk, a CD-ROM, or any other form of storage medium known in the art.

The embodiments of the present disclosure provide the method, apparatus and device for deleting a file in a distributed system, and the storage medium provided by the embodiments of the present disclosure, including: querying whether an incomplete file deletion operation exists under a sub-tree root corresponding to a certain MDS; continuing to delete data under the sub-tree root corresponding to the MDS if there is an incomplete file deletion operation, and determining whether the sub-tree root is a copy; and deleting the sub-tree root copy in a memory of the MDS if the sub-tree root is a copy. By means of the steps, the number of copies of the sub-tree root in the distributed file system can be reduced, thereby reducing the number of interaction times of master copy locking between different MDSs, improving the file deletion efficiency, and improving user friendliness and differentiated competitiveness of a product.

Finally, it should also be noted that, in this document, relational terms are used solely to distinguish one entity or operation from another entity or operation without necessarily requiring or implying any actual such relationship or order between such entities or operations. Also, the terms "includes", "including", or any other variation thereof, are intended to cover a non-exclusive inclusion, such that a process, method, article, or device that includes a list of elements does not include only those elements but may include other elements not expressly listed or elements inherent to such process, method, article, or device. Without further limitation, an element defined by the phrase "including an . . . " does not exclude the presence of other identical elements in the process, method, article, or device that includes the elements.

The method, apparatus, and device for deleting a file in a distributed system, and the storage medium provided by the present disclosure are described in detail above, and a specific example is applied in the present disclosure to explain the principle and the implementation of the present disclosure, and the description of the above embodiments is only used to help understanding the method and the core idea of the present disclosure; meanwhile, for a person of ordinary skill in the art, according to the idea of the present disclosure, the specific embodiments and the application range may be changed, and in summary, the content of the present specification should not be construed as a limitation to the present disclosure. Any modifications, equivalent replacements, or improvements made within the spirit and principle of the present disclosure should be included in the scope of the claims of the present disclosure.

What is claimed is:

1. A method for deleting a file in a distributed system, characterized by comprising:
   querying whether an incomplete file deletion operation exists under a sub-tree root corresponding to a certain metadata server (MDS);
   continuing to delete data under the sub-tree root corresponding to the MDS if there is an incomplete file deletion operation, and determining whether the sub-tree root is a copy; and
   deleting the sub-tree root copy in a memory of the MDS if the sub-tree root is a copy;
   creating a timed deleting task in the distributed system if there is no incomplete file deletion operation; and
   balancing the number of sub-tree roots to be deleted among different MDSs according to the created timed deleting task;
   wherein the step of balancing the number of sub-tree roots to be deleted among different MDSs according to the created timed deleting task specifically comprises:
      acquiring and recording the number of sub-tree roots to be deleted with the timed deleting task on each MDS; and calculating an average value of the number of sub-tree roots to be deleted on all MDSs; and migrating sub-tree roots to be deleted to the MDSs having a number of sub-tree roots to be deleted lower than the average value sequentially from the MDS having the largest number of sub-tree roots to be deleted, until no MDS having a number of sub-tree roots to be deleted less than the average value exists.

2. The method for deleting a file in a distributed system according to claim 1, characterized by further comprising:
performing segmentation and deletion operations on a file to be deleted according to the actual size of the file.

3. The method for deleting a distributed system file according to claim 2, characterized in that performing segmentation and deletion operations on a file to be deleted according to the actual size of the file specifically comprises:
segmenting the file to be deleted into a plurality of objects to be deleted of which the size is equal to a stripe value according to the actual size of the file;
sending the objects to be deleted to an OSD corresponding to the objects to be deleted sequentially according to a preset sequence; and
performing a disk deletion operation on all the objects to be deleted by means of the OSD.

4. A device for deleting a file in a distributed system, characterized by comprising a processor and a memory, wherein the memory has a computer program stored therein, and the computer program, when executed by the processor, causes the processor to perform the following steps:
querying whether an incomplete file deletion operation exists under a sub-tree root corresponding to a certain metadata server (MDS);
continuing to delete data under the sub-tree root corresponding to the MDS if there is an incomplete file deletion operation, and determining whether the sub-tree root is a copy; and
deleting the sub-tree root copy in a memory of the MDS if the sub-tree root is a copy;
creating a timed deleting task in the distributed system if there is no incomplete file deletion operation; and
balancing the number of sub-tree roots to be deleted among different MDSs according to the created timed deleting task;
wherein the step of balancing the number of sub-tree roots to be deleted among different MDSs according to the created timed deleting task specifically comprises:
acquiring and recording the number of sub-tree roots to be deleted with the timed deleting task on each MDS; and
calculating an average value of the number of sub-tree roots to be deleted on all MDSs; and
migrating sub-tree roots to be deleted to the MDSs having a number of sub-tree roots to be deleted lower than the average value sequentially from the MDS having the largest number of sub-tree roots to be deleted, until no MDS having a number of sub-tree roots to be deleted less than the average value exists.

5. A computer readable storage medium, having a computer program stored therein, characterized in that the computer program, when executed by a processor, causes the processor to perform the following steps:
querying whether an incomplete file deletion operation exists under a sub-tree root corresponding to a certain metadata server (MDS);
continuing to delete data under the sub-tree root corresponding to the MDS if there is an incomplete file deletion operation, and determining whether the sub-tree root is a copy; and
deleting the sub-tree root copy in a memory of the MDS if the sub-tree root is a copy;
creating a timed deleting task in the distributed system if there is no incomplete file deletion operation; and
balancing the number of sub-tree roots to be deleted among different MDSs according to the created timed deleting task;
wherein the step of balancing the number of sub-tree roots to be deleted among different MDSs according to the created timed deleting task specifically comprises:
acquiring and recording the number of sub-tree roots to be deleted with the timed deleting task on each MDS; and
calculating an average value of the number of sub-tree roots to be deleted on all MDSs; and
migrating sub-tree roots to be deleted to the MDSs having a number of sub-tree roots to be deleted lower than the average value sequentially from the MDS having the largest number of sub-tree roots to be deleted, until no MDS having a number of sub-tree roots to be deleted less than the average value exists.

* * * * *